United States Patent
Panse et al.

(10) Patent No.: US 11,093,288 B2
(45) Date of Patent: Aug. 17, 2021

(54) SYSTEMS AND METHODS FOR CLUSTER RESOURCE BALANCING IN A HYPER-CONVERGED INFRASTRUCTURE

(71) Applicant: VMware, Inc., Palo Alto, CA (US)

(72) Inventors: Tejas Sanjeev Panse, Sunnyvale, CA (US); Suket Gakhar, Cupertino, CA (US); Anant Kumar, Santa Clara, CA (US); Lakshmi Narasimhan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 33 days.

(21) Appl. No.: 16/440,702

(22) Filed: Jun. 13, 2019

(65) Prior Publication Data

US 2020/0394071 A1 Dec. 17, 2020

(51) Int. Cl.
  *G06F 9/46* (2006.01)
  *G06F 9/50* (2006.01)
  *G06F 9/445* (2018.01)
  *G06F 8/60* (2018.01)

(52) U.S. Cl.
  CPC ........ *G06F 9/5011* (2013.01); *G06F 9/44505* (2013.01); *G06F 8/60* (2013.01)

(58) Field of Classification Search
  CPC ....... G06F 9/5011; G06F 9/44505; G06F 9/60
  See application file for complete search history.

(56) References Cited

U.S. PATENT DOCUMENTS

| | | | | |
|---|---|---|---|---|
| 9,465,630 B1* | 10/2016 | Muniz | ............... | G06F 9/5077 |
| 2011/0231696 A1* | 9/2011 | Ji | ............... | G06F 11/203 |
| | | | | 714/3 |
| 2012/0260247 A1* | 10/2012 | Huang | ............... | G06F 9/5077 |
| | | | | 718/1 |
| 2012/0265882 A1* | 10/2012 | Hatasaki | ............... | G06F 9/5077 |
| | | | | 709/226 |
| 2013/0111468 A1* | 5/2013 | Davis | ............... | G06F 9/5077 |
| | | | | 718/1 |
| 2014/0280956 A1* | 9/2014 | Shu | ............... | H04L 41/0893 |
| | | | | 709/226 |
| 2014/0282539 A1* | 9/2014 | Sonnek | ............... | G06F 9/45558 |
| | | | | 718/1 |
| 2016/0162320 A1* | 6/2016 | Singh | ............... | G06F 9/5005 |
| | | | | 718/1 |
| 2020/0285502 A1* | 9/2020 | Hildebrand | ......... | G06F 9/45558 |

* cited by examiner

*Primary Examiner* — Diem K Cao
(74) *Attorney, Agent, or Firm* — Clayton, McKay & Bailey, PC

(57) ABSTRACT

Systems and methods herein can provide virtual resource management for hyper-converged infrastructures. In an example, a method can include identifying an overloaded cluster requesting at least one resource, the overloaded cluster including a hypervisor on a virtual machine. The method can further include identifying an additional cluster having a free resource corresponding to the requested resource. The method can include instantiating a nested host on the additional cluster, the nested host being configured to provide the free resource and the nested hosted comprising an additional hypervisor that manages an additional virtual machine. Further, the method can include registering the nested host with the overloaded cluster such that the overloaded cluster is authorized to use the free resource.

24 Claims, 7 Drawing Sheets

| CLUSTER NAME 302 | CLUSTER DESCRIPTION 304 | ASPECTS MEASURED 306 | | |
|---|---|---|---|---|
| | | | COMPUTE 320 | STORAGE 322 |
| C1 308 | STAGING 314 | THRESHOLD | 0.8 | 0.8 |
| | | CURRENT | 0.2 | 0.3 |
| C2 310 | PRODUCTION 316 | THRESHOLD | 0.6 | 0.6 |
| | | CURRENT | 0.7 | 0.8 |
| C3 312 | MARKETING DB 318 | THRESHOLD | 0.9 | 0.6 |
| | | CURRENT | 0.3 | 0.5 |

*FIG. 3*

| CLUSTER NAME 402 | CLUSTER DESCRIPTION 404 | ASPECTS MEASURED 406 | | |
| --- | --- | --- | --- | --- |
| | | | COMPUTE 420 | STORAGE 422 |
| C1 408 | STAGING 414 | THRESHOLD | 0.8 | 0.8 |
| | | CURRENT | 0.2 | 0.3 |
| C1 410 | PRODUCTION 416 | THRESHOLD | 0.6 | 0.6 |
| | | CURRENT | 0.7 | 0.7 |
| C1 412 | MARKETING DB 418 | THRESHOLD | 0.9 | 0.6 |
| | | CURRENT | 0.3 | 0.7 |

| CLUSTER NAME 402 | CLUSTER DESCRIPTION 404 | ASPECTS MEASURED 406 | | |
|---|---|---|---|---|
| | | | COMPUTE 420 | STORAGE 422 |
| C1 408 | STAGING 414 | THRESHOLD | 0.8 | 0.8 |
| | | CURRENT | 0.4 | 0.7 |
| C2 410 | PRODUCTION 416 | THRESHOLD | 0.6 | 0.6 |
| | | CURRENT | 0.7 | 0.7 |
| C3 412 | MARKETING DB 418 | THRESHOLD | 0.9 | 0.6 |
| | | CURRENT | 0.3 | 0.4 |

| CLUSTER NAME 402 | CLUSTER DESCRIPTION 404 | ASPECTS MEASURED 406 | | |
|---|---|---|---|---|
| | | | COMPUTE 420 | STORAGE 422 |
| C1 408 | STAGING 414 | THRESHOLD | 0.8 | 0.8 |
| | | CURRENT | 0.4 | 0.7 |
| C2 410 | PRODUCTION 416 | THRESHOLD | 0.6 | 0.6 |
| | | CURRENT | 0.6 | 0.6 |
| C3 412 | MARKETING DB 418 | THRESHOLD | 0.9 | 0.6 |
| | | CURRENT | 0.5 | 0.6 |

| NH_ID 502 | PROPERTIES 504 | STATUS 506 |
|---|---|---|
| N1 508 | 32GB MEMORY, 4 TB STORAGE, 8 CORES | ASSIGNED |
| N2 510 | 16GB MEMORY, 1 TB STORAGE, 4 CORES | ASSIGNED |
| N3 512 | 8GB MEMORY, 1 TB STORAGE, 4 CORES | UNASSIGNED |

FIG. 5B

| OWNER 512 | LOANED TO 514 | TIME 516 | NH_ID 518 |
|---|---|---|---|
| C1 | C2 | T1 | N1 |
| C3 | C2 | T1 | N2 |

SYSTEMS AND METHODS FOR CLUSTER RESOURCE BALANCING IN A HYPER-CONVERGED INFRASTRUCTURE

BACKGROUND

Virtual machines ("VMs") can be executed by a group, or "cluster," of host computing devices. A VM can generate an abstraction of physical computing resources, such as a processor and memory, of the host executing the VM. The VM can additionally execute a "guest" operating system, which, in turn, executes one or more software applications. The abstracted resources can be functionally indistinguishable from the underlying physical resources to the guest operating system and software applications.

The amount of computing resources allocated to the VMs on a host can be designated manually by an administrator of the cluster and automatically according to resource policies set by the administrator. In some clusters, an operator attempts to uniformly distribute, or "balance," the use of computing resources, also known as the computing "load," across multiple hosts. For example, a cluster monitoring software can be used to monitor the load on hosts in the cluster and present load information to a user. The load information presented can include various statistics, such as the load of the hosts in the cluster, an average load of hosts in the cluster, and a standard deviation of the loads in the cluster. Further, such software can determine and present load balancing recommendations, such as a recommendation that a VM be migrated from a host with a high load to a host with a lower load.

However, such manual or automated balancing of the computing resources across hosts can be inefficient or difficult to implement, for example, due to various network policies. For example, different clusters on a network may have associated affinity and anti-affinity rules and service level agreement (SLA) policies that may impose restrictions on resource balancing. Further, some network clusters may have excess reserves for which an general reallocation can be wasteful and may reduce the clusters' backup resource availability.

Accordingly, a need exists for systems and methods for providing efficient resource balancing in virtualized networks.

SUMMARY

Examples described herein include systems and methods for virtual resource management. The systems and methods are generally directed to cluster resource balancing in a hyper-converged infrastructure ("HCI") environment. As detailed below, the systems and methods are directed to generating and managing nested hosts (for example, hypervisors in a virtual machine) carved out of one or more available clusters in the HCI environment. Nested hosts may refer to VMs and hypervisors that are used in other respective VMs. The hosts may have access to hardware that provides computing resources such as processing power, memory, disk and network input/output capabilities. The nested hosts can be used to provide additional resources to overloaded clusters to reduce their load to within defined thresholds. Moreover, the disclosed systems can generate the nested hosts so that the clusters on which they are created do not exceed respective defined thresholds such that the clusters in the HCI are balanced. The deployment of nested hosts on the additional clusters in the virtual domain can provide the advantage of avoiding the costs of moving physical hosts across clusters.

More specifically, an example system is provided that includes a non-transitory, computer-readable medium (for example, memory) and at least one processor. The processor can execute the instructions to perform various operations for virtual resource management. In particular, the system can identify an overloaded cluster requesting at least one resource. The overloaded cluster can include a hypervisor on a virtual machine. In some examples, the system can identify the additional cluster by ensuring that a cost of network communication is reduced. For example, there can be a cost associated with data transmissions on the network between clusters that correspond to network components that are physically close to (or distanced apart from) one another.

The system can further identify an additional cluster having a free resource corresponding to the requested resource. Resources can include, but not be limited to, compute, memory, and storage capabilities. Then, the system can instantiate a nested host on the additional cluster. The nested host can include an additional hypervisor that manages an additional virtual machine. The system can configure the nested host to provide the free resource for use by other clusters such as the overloaded cluster. Further, the system can register and thereby add the nested host with the overloaded cluster such that the overloaded cluster can use the free resource. Accordingly, the load on the cluster and throughout the HCI can be reduced.

In one example, the system can calculate resource utilization and compare a given cluster's available resource capacity with that of the overloaded cluster and other clusters on the HCI. The comparison can be performed to determine how to perform the load and resource rebalancing using the nested hosts. In particular, the system can identify the overloaded cluster by calculating and assigning indices to the clusters of the HCI. The indices can characterize the clusters' respective computational loads. The system can then determine at least one index of the indices exceeding an index threshold. The system can determine the index threshold associated with a cluster based on a usage of the cluster. For example, low-priority and low-use clusters may not have as stringent index thresholds relative to higher-priority and higher-use clusters.

In some examples, the system can identify a third cluster having the free resource and can instantiate a second nested host on the third cluster. The system can further register the second nested host with the overloaded cluster. The system can perform the registering based on determining that the overloaded cluster requires additional resources. In other examples, the system may identify a second overloaded cluster and can instantiate a second nested host on the additional cluster. The system can register the second nested host with the second overloaded cluster.

In some examples, the system can identify not only one additional cluster but rather, two or more additional clusters. Further, the system can generate not only a single nested host but rather, two or more nested hosts. This can be performed because the additional resources may not be available on a single additional cluster. Once the additional clusters are identified, the system can add the nested hosts to the overloaded clusters. This can be performed by (1) determining that the free resource is equal to or greater than the requested resource, and (2) determining that indices characterizing the clusters' respective computational loads drop below respective index thresholds to ensure that the HCI's clusters are balanced.

In some examples, the system can further determine a projected index indicative of future computational loads on the overloaded cluster. In particular, while the index can characterize the overloaded cluster's current computational load, the projected index can characterize the overloaded cluster's computational load without the use of a nested host. That way, the system can determine whether the nested host continues to have a load balancing effect on the overloaded cluster. If the system determines that the projected index drops below an index threshold, the system can remove the nested host from the overloaded cluster. Similarly, the system can determine whether the additional cluster has an increased computational load. If so, then the system can use a nested host life cycle management process to remove the nested host from the cluster to release the free resource back to the additional cluster. In this manner, the system provides near real time and continuous load balancing for the virtualized network. Accordingly, the disclosed systems can have a technical advantage of providing a resilient HCI that is capable of addressing changing network conditions, such as the occurrence of sudden load peaks.

Once the system has added the nested hosts to the overloaded cluster, the system can perform various operations to ensure that the nested hosts, the overloaded cluster, the additional cluster, and other related components are configured to operate together. In particular, the system can (1) configure a virtual local area network ("VLAN") associated with the overloaded cluster to operate with a physical network, and (2) configure a virtual network associated with the additional cluster to operate with the VLAN.

The stages described above can be performed by a system in some examples. Alternatively, a non-transitory, computer-readable medium including instructions can cause a processor to perform the stages when the processor executes the instructions.

Both the foregoing general description and the following detailed description are exemplary and explanatory only and are not restrictive of the examples, as claimed.

BRIEF DESCRIPTION OF THE DRAWINGS

FIG. 3 illustrates an example table including cluster indices as determined by example operations of the disclosed systems.

FIGS. 4A-4C illustrate additional example tables including cluster indices as determined by example operations of the disclosed systems.

FIGS. 5A-5B illustrate example tables of historical records of nested hosts loaned out to clusters that can be used by the system in conducting future virtual resource management operations.

DESCRIPTION OF THE EXAMPLES

Figure 1:
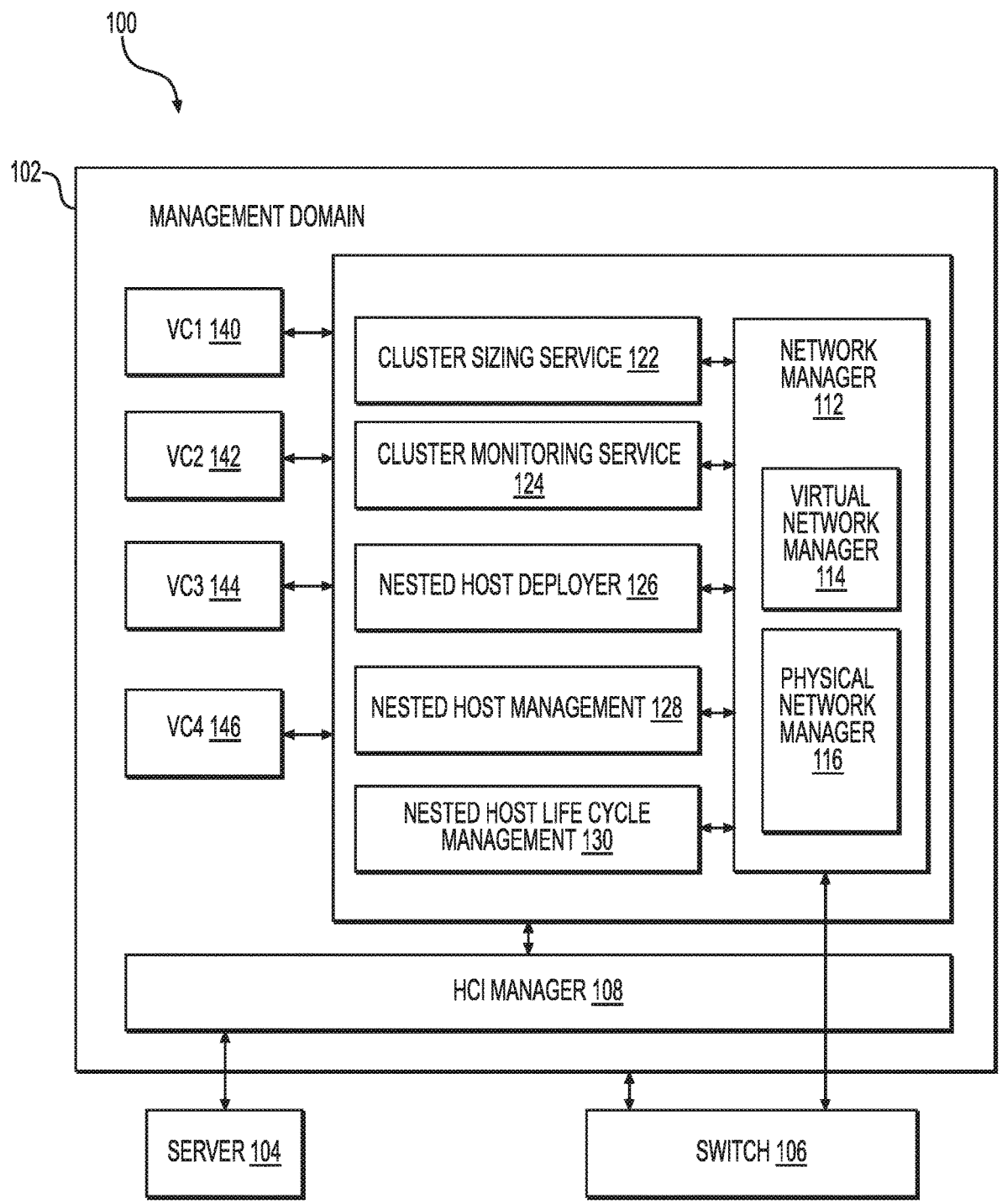
FIG. 1 is an example system diagram capable of allocating and managing nested hosts from at least one cluster to an overloaded cluster in an HCI.

Reference will now be made in detail to the present examples, including examples illustrated in the accompanying drawings. Wherever possible, the same reference numbers will be used throughout the drawings to refer to the same or like parts.

As used herein, a "host" can refer to a virtual representation of the computing and memory resources of a physical machine having memory and a processor. A host can represent the aggregate computing and memory resources of a physical server. For example, if the physical server has four dual-core central processing units ("CPUs") running at 4 gigahertz ("GHz") each and 32 GB of system memory, the host can have 32 GHz of computing power and 32 GB of memory available for running virtual machines that are assigned to it.

As used herein, a "cluster" can refer to an aggregate set of resources in a virtual environment. A cluster can represent the aggregate computing and memory resources of a group of physical servers sharing the same network and storage arrays. For example, if the group contains eight servers with four dual-core CPUs each running at 4 GHz with 32 GB of memory, the cluster can have an aggregate 256 GHz of computing power and 256 GB of memory available for running virtual machines.

As used herein, a "resource pool" can refer to partitions of computing and memory resources from a single host or a cluster. Resource pools can be hierarchical and nested. The disclosed systems can partition any resource pool into smaller resource pools to divide and assign resources to different groups or for different purposes. Resource pools can be dynamically reconfigured so that the information technology ("IT") environment matches a given company's organization.

In general, hosts, clusters, and resources pools can provide flexible and dynamic ways to organize the aggregated computing and memory resources in the virtual environment and link them back to the underlying physical resources.

As used herein, a "virtual machine" can refer to a software simulation of a hardware platform that provides a virtual operating environment for guest operating systems.

As used herein, a "hypervisor" can refer to a software program that runs on an actual host hardware platform and supervises the execution of the guest operating systems on the virtual machines.

As used herein, a "container" can refer to a virtual runtime environment that runs on top of a single operating system ("OS") kernel and emulates an operating system rather than the underlying hardware.

As used herein, a "hyper-converged infrastructure" ("HCI") can refer to a type of infrastructure system that is largely software-defined with tightly integrated compute, storage, networking and virtualization resources. In particular, the HCI can use the hypervisor to deliver compute, networking, and storage capabilities from a single server platform, creating an integrated, building block approach to IT infrastructure.

As used herein, a "virtual storage area network" ("vSAN") can refer to a software-based logical partition in a physical storage area network ("SAN") that can aggregate local or directly attached data storage devices. It can thereby create a single storage pool shared across the hosts in the vSAN cluster. Further, the vSAN can reduce the need for external shared storage, and simplifies storage configuration and virtual machine provisioning.

While the present disclosure includes examples using VMWARE-based implementations, it is to be understood that embodiments of the present disclosure may be used in connection with any suitable virtualized network implementation.

As used herein, "affinity rules" can refer to policies can be applied when business requirements mandate that two or more virtual machines stay on the same host. In contrast, as used herein, "anti-affinity rules" can refer to policies that can be applied when the business requirements determine to have certain virtual machines run on different hosts. Affinity rules can serve to ensure that if one of the virtual machines moves to a different host, other associated virtual machines move to the same host as well. For example, a given organization can prefer having communication between application and database servers stay on the same host rather than having the communication traverse a network link. Affinity rules can be used to boost performance. Anti-affinity rules can provide a level of fault tolerance.

In an HCI, a cluster can refer to a policy-based resource container with specific availability and performance attributes. In particular, such a cluster can combine virtualized computing capabilities (for example, by vSphere), virtualized storage capabilities (for example, by vSAN) and virtualized networking (for example, by a network virtualization platform such as NSX by VMWARE INC.) into a single consumable unit. In some examples, the network virtualization platform can enable the implementation of virtual networks on a physical network and within a virtual server infrastructure. The cluster can include hypervisors with an entity to manage the hypervisors. In particular, the hypervisors can be provided by, for example, a virtualization layer that can run on physical servers that abstracts processor, memory, storage, and resources into multiple virtual machines. Further, the entity can include, for example, a data center management server application. In some examples, the virtualization layer can include, Elastic Sky Xi ("ESXi") by VMWARE INC. of Palto Alto, Calif. Moreover, the data center management server application can include vCenter developed by VMWARE INC. to monitor virtualized environments. In some examples, the data center management server application can provide centralized management and operation, resource provisioning, and performance evaluation of virtual machines residing on a distributed virtual data center.

Cluster performance can be based on numerous factors. Non-limiting examples of such factors include the number of virtual machines deployed, the load on the virtual machines, replication (for example, a process of automatically creating and maintaining replicas of virtual machines), policies defined on the cluster, computing, memory, and storage resources offered by hosts, combinations thereof, and the like.

When cluster loads increase, virtual machines can contend for available resources. Personnel (such as IT administrators) can define policies to offer some virtual machines a higher share of the overall cluster resources during such contention. However, as detailed below, these policies may not always help improve the overall cluster performance.

Moreover, if a given cluster load peaks beyond a given threshold, personnel can need to intervene to make additional resources available to the cluster. In such cases, an organization can maintain a pool of free hosts and extra resources for backup (for example, a resource pool). If free resources are not available, a host can be reallocated from a cluster that is not heavily loaded. The host can be added to the heavily loaded cluster to balance system performance. Automated services can reduce the need for human intervention by monitoring cluster health throughout the HCI. For example, when the load on one cluster crosses a threshold, hosts from a resource pool including free hosts can be automatically added to the overloaded cluster. Further, if there is no resource pool available, hosts from other, underloaded clusters can be recruited for use.

However, the reallocation of resources can be difficult to implement because different clusters can have different associated policies. Such policies can include affinity and anti-affinity rules. For example, a given cluster A's load can exceed a defined threshold. Cluster B can have three hosts and can have a comparatively reduced load. However, a given cluster B can have an anti-affinity rule stating, "no virtual machines of type database should exist on the same host." Cluster B can further include three database virtual machines, with one virtual machine on a host. To remove a host from cluster B can involve the database virtual machine on the host being taken down from cluster B and being relocated to another host in the same cluster. However, this can break cluster B's anti-affinity rule. Thus, even if cluster B has resources to contribute to cluster A, it can still be unavailable to help reduce cluster A's load. Accordingly, an IT administrator can need to manually intervene to temporarily disable cluster B's contending policies. However, such a process can be computationally and temporally inefficient.

As another example, an example cluster A can exceed a storage threshold by 500 GB. However, adding a host from another cluster B with substantially higher storage (for example, 64 terabytes ("TB") of storage) can be wasteful. Additionally, by adding a host from cluster B, cluster B can have reduced backup resource availability because of its reduced reserves.

In view of these problems, a need exists for systems and methods for efficiently balancing clusters in an HCI.

In some examples, a cluster can be managed by a hypervisor. As noted, conventional systems can implement virtual machines to perform any suitable service, and a given virtual machine can have a hypervisor. The disclosed systems can include a virtual machine on a cluster that serves as another hypervisor that manages a nested host, which can itself also be a virtual machine. Accordingly, the disclosed systems can include a given virtual machine (corresponding to a nested host) having additional virtual machines that are managed by the given virtual machine. Accordingly, the examples described herein include systems and methods for allocating a portion of nested hosts from at least one cluster to an overloaded cluster in an HCI. The nested hosts can meet the excess resource requests of an overloaded cluster. The disclosed systems can thereby bring the overloaded cluster's load within predetermined threshold limits. In some examples, the nested host can include a hypervisor in a virtual machine. Moreover, the disclosed systems can apportion nested hosts from other clusters such that the other clusters do not exceed their individual threshold requirements. This can ensure that the clusters in the HCI are balanced.

In some examples, the addition of a free host with a relatively large amount of resources to an overloaded cluster can result in the overloaded cluster gaining unnecessary additional capacity. Accordingly, the disclosed systems can deploy a nested host having a smaller resource availability on the free host and can add the nested host to the overloaded cluster. Accordingly, resources offered by such a free host can be shared between multiple clusters. Additionally, the disclosed systems can split the free host into multiple smaller nested hosts, thereby reducing the computational burden onto multiple overloaded clusters.

In some examples, resource sharing among clusters can have associated security risks. To mitigate the risks, the disclosed systems can create a secured cluster of physical hosts on which the nested hosts can be run. For example, the disclosed systems can deploy the nested hosts on a secure management cluster, which can include a set of hosts meant to hold the management virtual machines needed for managing an HCI environment.

FIG. 1 is an illustration of an exemplary system for allocating and managing nested hosts from at least one cluster to an overloaded cluster in an HCI. In particular, diagram 100 shows a management component 102, which can be virtualized and implemented in software. Management component 102 can be configured to communicate with physical hardware such as a server 104 and a switch 106. The switch 106 can refer to a networking device that connects devices on a network by using packet switching to receive, process, and forward data to a destination device.

Further, the server 104 can communicate with the management component 102 by an HCI manager 108. The HCI manager 108 can be configured to work with a nested host manager 128. Further, the switch 106 can be configured to interface with a network manager 112. The network manager can include a virtual network manager 114 configured to manage the virtual aspects of the underlying physical network, such as the various components of the nested host manager 128. The network manager 112 can further include a physical network manager 116 configured to manage the physical aspects of the underlying physical network, such as switch 106. The nested host manager 112 can include various components configured to operate with virtual clusters ("VCs") such as VC1 140, VC2 142, VC3 144, and VC4 146. The VCs can simply be referred to as clusters herein.

As will be detailed further below, the system can include a variety of components used to perform virtual resource management. For example, the system can include a cluster sizing service 122 configured to determine various indices associated with a given cluster, each index indicative of resource usage. The system can include a cluster monitoring service 124 configured to monitor the clusters for resource needs and capacities. The system can include a nested host deployer 126 that is configured to instantiate and register the nested host on overloaded clusters. Further, the system can include a nested host life cycle management 130 component that can be configured to remove a given nested host from a cluster when the cluster is no longer suitable for hosting the nested host.

As noted, the disclosed systems can deploy the nested hosts on a secure management cluster, which can include a set of hosts meant to hold the management virtual machines needed for managing an HCI environment.

As noted, the system can serve to deploy nested hosts on various clusters on the HCI. Further, the nested host deployer 126 can add the nested hosts to an overloaded cluster such that the overall cluster load reduced across the HCI. The system can use the HCI manager 108 to monitor cluster load and manage nested hosts on the HCI.

The system's cluster monitoring service 124 can monitor various characteristics of the clusters. For example, the cluster monitoring service 124 can monitor the computational, memory, and storage resources, the total packets received and sent from hosts in a cluster, and the like. The cluster monitoring service 124 can then assign respective index for the characteristics. In some examples, the indexes can take on a value between 0 and 1. The indices can define the load on the cluster.

As noted, the disclosed systems can provide resource balancing to the clusters of the HCI and have numerous advantages over conventional systems. For example, the disclosed systems can avoid wasting resources by adding an entire physical host to an overloaded cluster. The disclosed systems can enable the sharing of resources provided by larger physical hosts to satisfy the resource requests of multiple overloaded clusters. The disclosed systems can offer an infrastructure that can address sudden load peaks. The disclosed systems avoid the need to move physical hosts across clusters by deploying nested hosts instead.

In some examples, the addition of a nested host to a given cluster can incur overhead. The overhead can include additional resources to deploy, configure, and add the nested host to a workload domain on the overloaded cluster. Accordingly, the disclosed systems can minimize the number of nested hosts to be added to an overloaded cluster. Further, a nested host can include a virtual machine running on a host in the HCI.

The disclosed systems can deploy multiple nested hosts when needed. For example, a given physical host may not be able to provide enough resources to run a nested host as large as the physical host needing the resources. As another example, an associated workload domain selected to run the nested hosts can have various restrictions. The restrictions can involve the number and size of virtual machines running at a given time that enable the virtual machine to have a high availability. Accordingly, the disclosed systems can deploy multiple nested hosts to satisfy the computational, memory and storage requests of a given physical host. The disclosed systems can use a nested host deployer 126 to deploy the nested hosts and a nested host management 128 component to manage the nested hosts after deployment.

The disclosed systems can use the HCI manager 108 to manage the HCI. For example, the HCI manager 108 can control the hardware and software resources bundled within the HCI instance. The HCI manager can also create and maintain clusters. This can be similar to the capabilities of a software-defined data center ("SDDC") manager service, for example, in Cloud Foundation software by VMWARE.

As an example, the cluster monitoring service 124 can measure computational resources, memory, and storage aspects for a group of clusters. The cluster monitoring service 124 can determine that a given cluster ("cluster B") has a total capacity of 64 cores at 2 GHz per core, 256 GB memory and 6 TB of storage. Further, the cluster monitoring service 124 can determine that cluster B is running at 32 GHz, using 64 GB memory and 1 TB of storage. Accordingly, the cluster monitoring service 124 can assign an index for cluster B as follows: compute=(32/2)/64=0.25, memory=64/256=0.25, and storage=1/6=0.167.

In some examples, the cluster monitoring service 124 can update the indexes for the clusters at regular intervals. Further, the disclosed systems can define thresholds for the measured aspects per cluster, based on a usage of the cluster and the relative importance of the cluster to an entity. For example, a cluster running a relatively higher-priority virtual machine (for example, a production virtual machine) can have a relatively higher sensitivity thresholds for different measured aspects. In contrast, a lower-priority cluster (for example, a staging cluster meant for developer use) might have relatively relaxed thresholds. If one or more aspect index exceeds the defined threshold, the cluster sizing service can calculate the additional resources needed to get the indexes below the threshold.

In another example, cluster B can have different thresholds at a different time or based on a different network configuration. For example, cluster B can have different thresholds defined as compute=0.8, storage=0.6, memory=0.8. In this case, the cluster monitoring service 124 can determine different indexes as follows: compute=0.5, storage=0.9, memory=0.5. The cluster sizing service 122 can then calculate the resources needed to get the storage index to about 0.6 or less. For example, the current overall cluster storage can be determined to be 0.9*6 TB=5.4 TB. Accordingly, the cluster sizing service 122 can determine that if the total cluster storage is expanded to 5.4/0.6=9 TB, the storage index would drop down to 5.4/9=0.6. Thus, the cluster sizing service 122 can determine that cluster B needs about 3 TB of additional storage.

The cluster sizing service 122 can then seek other clusters to support this resource request. The disclosed systems can minimize the number of nested hosts deployed to support the resource request. This can minimize the additional overhead needed to deploy, configure, and add a nested host to a cluster. Accordingly, the cluster monitoring service 124 can identify a cluster that is able to support a nested host and that can satisfy the resource request without exceeding its own thresholds. The cluster monitoring service 124 can then send a request to the nested host deployer 125 service to create a nested host with the capacity and add it to the overloaded cluster. If the other clusters are not able to support the resource request, the nested host deployer 126 component can deploy multiple nested hosts on multiple clusters. This can allow the cumulative resources offered by the nested hosts to be equal to or greater than the requested resource of the overloaded cluster, in order to get the aspect indexes below their individual thresholds. In the above example, none of the clusters can be able to offer 6 TB of storage directly; however, there can be three such clusters that can individually offer 4 TB. Accordingly, two nested hosts can be deployed such that the cumulative storage offered by both clusters is 6 TB, including the additional consideration of providing for the storage overhead for the nested hosts.

Figure 2A:
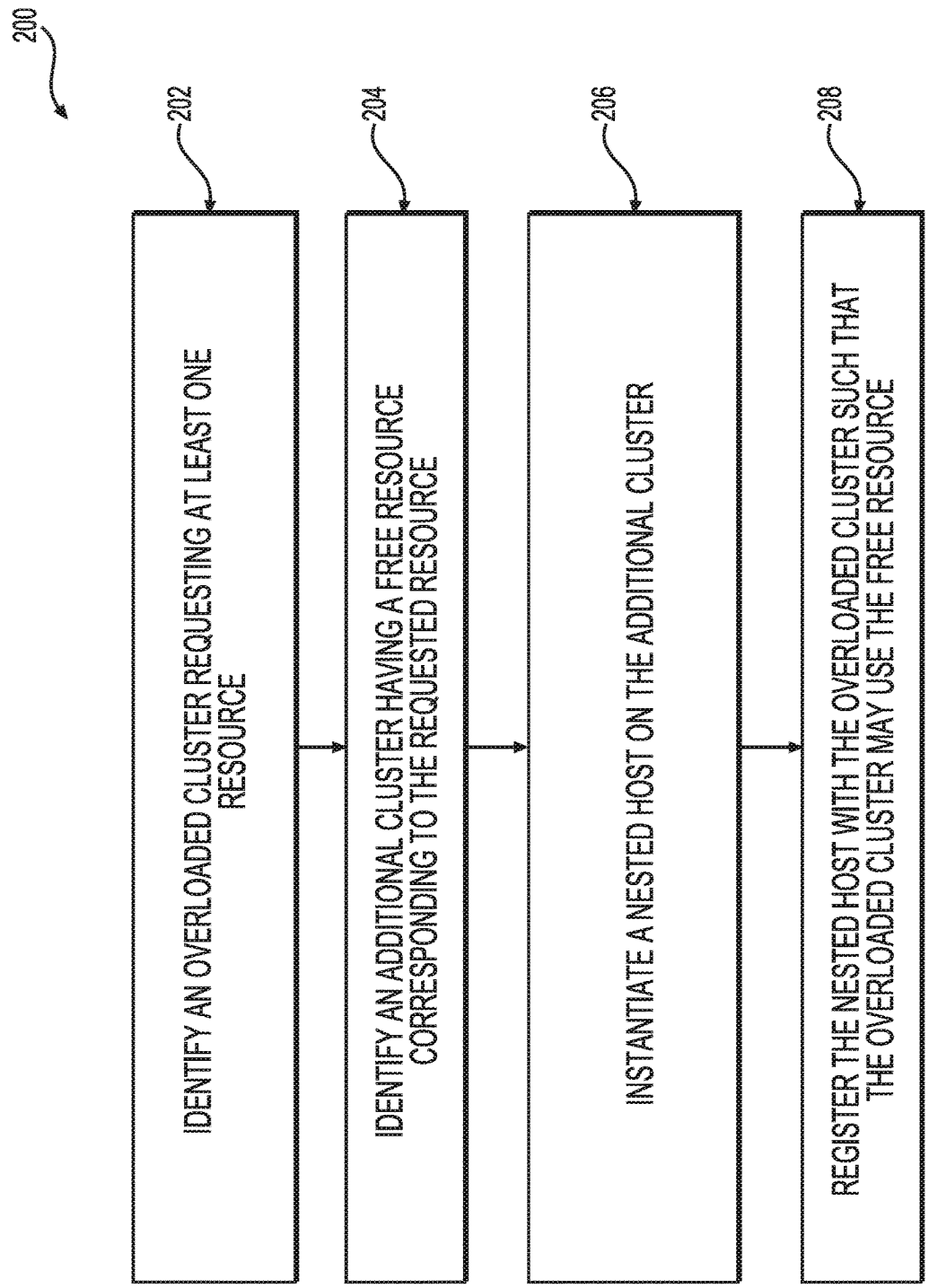
FIG. 2A is a flowchart of an example method for virtual resource management on HCIs, using a system such as the system of FIG. 1.

FIG. 2A is an exemplary method 200 of virtual resource management on HCIs, using a system similar to the system represented in diagram 100 of FIG. 1. At stage 202, the disclosed systems can identify an overloaded cluster requesting at least one resource. In some examples, the overloaded cluster can include a hypervisor on a virtual machine. The disclosed systems can identify the overloaded cluster by assigning, by the cluster sizing service 122, indices to the clusters, the indices characterizing the clusters' respective computational loads. Further, the disclosed systems can determine at least one index of the indices exceeding an index threshold. The disclosed systems can determine the index threshold associated with a cluster based on a usage level of the cluster. For example, certain clusters designated for lower-priority services can be assigned less stringent thresholds than clusters designated for higher-priority services.

At stage 204, the disclosed systems can identify an additional cluster having a free resource corresponding to the requested resource. In some examples, the cluster monitoring service 124 can monitor network communications and interrogate various clusters to determine the additional cluster. In some examples, the disclosed systems can identify the additional cluster such that a cost of network communication is reduced.

The additional cluster can include at least two additional clusters and the nested host can include at least two nested hosts. Further, the disclosed systems can register the nested host to the overloaded cluster by (1) determining that the free resource is equal to or greater than the requested resource, and (2) determining that indices characterizing the clusters' respective computational loads drop below respective index thresholds.

At stage 206, the disclosed systems can instantiate a nested host on the additional cluster. In some examples, the nested host configured to provide the free resource and including an additional hypervisor that manages an additional virtual machine. In particular, the instantiation can include the disclosed systems providing, to the additional cluster, a description of the resources requested of the overloaded cluster in terms of compute, memory, and storage resources. Further, the instantiation can include generating a formal networking relationship between the clusters. In some examples, a cluster can include a group of hosts. When a host (for example, a nested host) is added to a cluster, the host's resources can become part of the cluster's resources. Further, the cluster can manage the resources of the hosts that it includes.

At stage 208, the disclosed systems can register the nested host with the overloaded cluster such that the overloaded cluster can use the free resource. For example, the registration can include recording various information associated with the connection (for example, medium access control (MAC) addresses, ports, timing information, and the like) in a database stored in memory. The registration can further include updating other virtual and physical devices about the connection.

The disclosed systems can configure a virtual local area network ("VLAN") associated with the overloaded cluster to operate with a physical network. Further, the disclosed systems can configure a virtual network associated with the additional cluster to operate with the VLAN.

The disclosed systems can determine an index characterizing the cluster's computational load. The disclosed systems can further determine that a projected index, characterizing the cluster's computational load without using the nested host, drops below an index threshold. Accordingly, the disclosed systems can remove the nested host from the cluster.

The disclosed systems can determine that the additional cluster has an increased computational load. Accordingly, the disclosed systems can remove the nested host from the cluster to release the free resource back to the additional cluster.

Figure 2B:
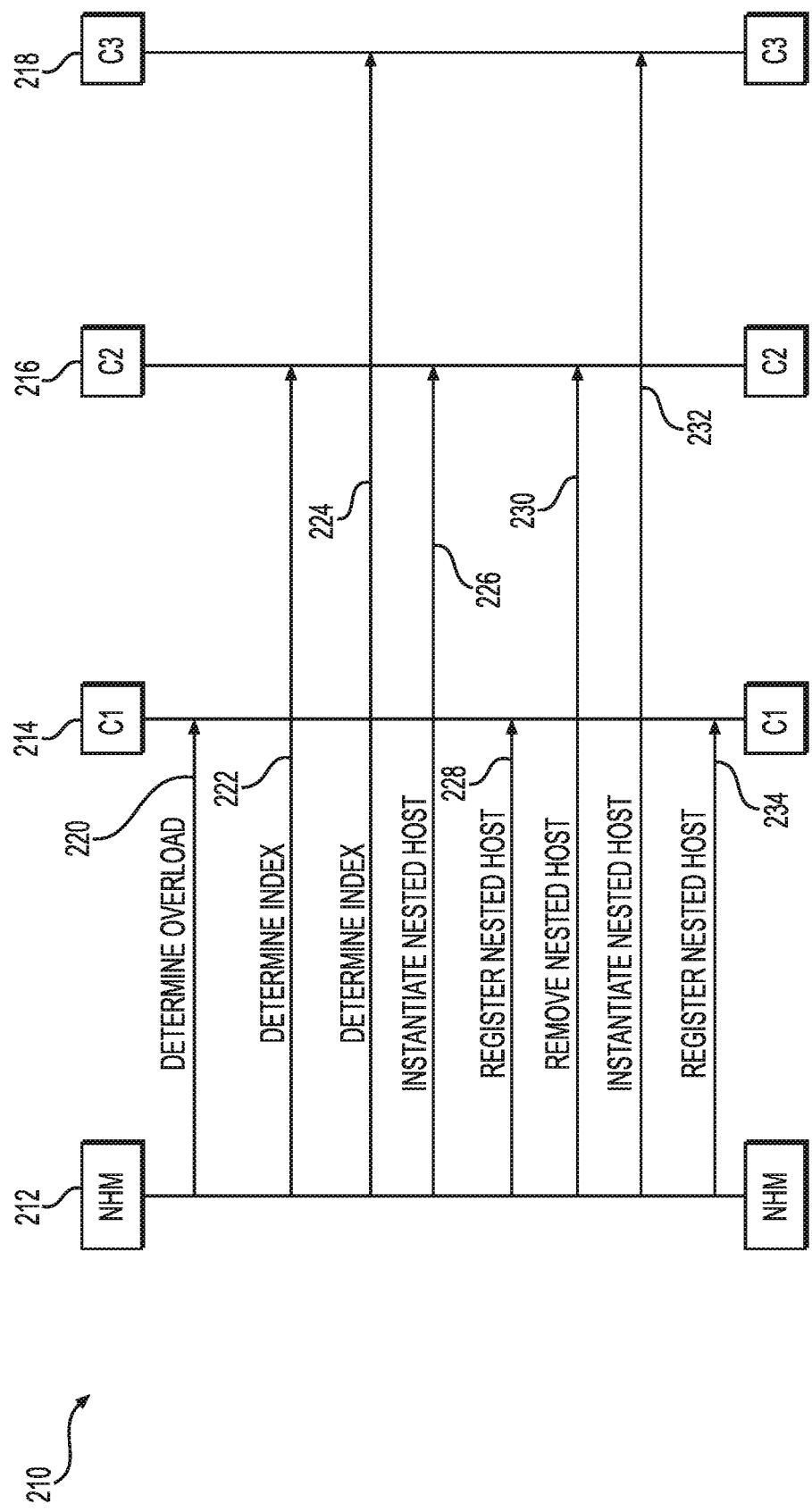
FIG. 2B is an example sequence diagram of example stages illustrating the addition and removal of nested hosts on various clusters based on the clusters' evolving resource capacities.

FIG. 2B is an example sequence diagram of example stages illustrating the addition and removal of nested hosts on various clusters based on the clusters' evolving resource capacities. At stage 220, the network host manager ("NHM") 212 can determine that an overload exists on a cluster C1 214. For example, the NHM 212 can use a cluster monitoring service 124 to identify the overloaded cluster C1 214. Alternatively or additionally, cluster C1 214 can provide a message to the NHM 212 indicative of an overloaded condition. For example, cluster C1 214 can determine that it is running out of storage and generate a message to the NHM 212 indicating this condition.

At stage 222, the NHM 212 can determine an index associated with an additional cluster, for example, a cluster C2 216. The NHM 212 can determine the index using a cluster sizing service 122. As detailed below in connection with FIGS. 3-4, the cluster sizing service 122 can perform various calculations based on current and threshold resource usage by the additional cluster to determine the index.

At stage 224, the NHM 212 can also determine an index associated with an additional cluster, for example, a cluster C3 218. The NHM 212 can determine that the index associated with cluster C2 216 is indicative of a greater near-term resource capacity on cluster C2 216 as opposed to cluster C3 218.

Accordingly, at stage 226, the NHM 212 can instantiate a nested host on the cluster C2 216. In particular, the instantiation can include the disclosed systems providing, to cluster C2 216, information regarding the needs of cluster C1 214 in terms of compute, memory, and storage resources. Further, the instantiation can include generating a formal networking relationship between clusters C1 214 and C2 216.

At stage 228, the NHM 212 can register the nested host that was instantiated on the cluster C2 216 on the overloaded cluster C1 214. For example, the registration can include recording various information associated with the connection (for example, MAC and internet protocol (IP) addresses, ports, timing information, and the like) in a database stored in memory. The registration can further include updating other virtual and physical devices about the connection.

The NHM 212 can use the nested host management 128 component to continue to monitor and assess the status of the additional cluster C2 216 on which the nested host was created. In particular, the nested host management 128 component can monitor the resource capacity of the additional cluster C2 216 over time. The nested host management 128 component can use the cluster sizing service 122 to continuously determine associated indices. At some point, the nested host management 128 component can determine that the additional cluster C2 216 is no longer able to efficiently provide resources to the overloaded cluster C1 214. Accordingly, at stage 230, the NHM 212 can remove the nested host that was instantiated on the cluster C2 216.

The NHM 212 can continue to determine indices of other clusters. For example, the NHM 212 can determine the current index associated with cluster C3 218, which can have changed since its previous value was determined at stage 224, above. The NHM 212 can determine that the index associated with cluster C3 218 is indicative of a near-term resource capacity on cluster C3 218. Accordingly, at stage 232, the NHM 212 can therefore instantiate a nested host on the cluster C3 218. At stage 234, the NHM 212 can register the nested host that was instantiated on the cluster C3 218 on the overloaded cluster C1 214. Moreover, the NHM 212 can repeatedly implement the process illustrated above with reference to clusters C2 214 and C3 218 continuously and with additional clusters (not shown). In this way, the NHM 212 can provide resource balancing for clusters on the HCI.

A detailed example of optimizer operation will now be discussed with reference to FIGS. 3 and 4A-C. These figures include example tables of values to explain various stages of the example resource balancing on the HCI.

In particular, FIG. 3 shows an exemplary table including cluster indices as determined by operations of the disclosed systems. In an example, the disclosed systems can monitor three clusters. Table 300 shows rows including cluster name 302, cluster description 304, and aspects measured 306. In particular, the cluster names 302 include cluster C1 308, cluster C2 310, and cluster C3 312 used for example business features such as staging 314, production 316, and marketing database 318, respectively. The clusters can have corresponding threshold indices and current indices. These indices can be measured and listed for the compute 320 and storage 322 resources.

The cluster sizing service 122 of FIG. 1 can determine which cluster to deploy the nested hosts on, based on resource availability. The cluster sizing service can deploy nested hosts such that the overall cost of network communication is reduced. For example, the disclosed systems can reduce communications between hosts residing on the same network components (or in some cases, components distanced from one another) to eliminate associated costs. In the example corresponding to table 300, even if cluster C1 308 is able to satisfy cluster C2's 310 compute 320 request, the cluster sizing service can determine to deploy nested hosts on cluster C3 312. For example, cluster C2 310 and cluster C3 312 can have hosts physically located in the same rack and the disclosed systems can seek to avoid inter-rack communication.

FIGS. 4A-4C provide additional exemplary tables including cluster indices as determined by operations of the disclosed systems. FIG. 4A shows a table 401 that is representative of the example described above in relation to FIG. 3, but with different representative cluster indices. Table 400 also shows rows including cluster name 402, cluster description 404, and aspects measured 406. The cluster names 402 also include cluster C1 408, cluster C2 410, and cluster C3 412 used for example business features such as staging 414, production 416, and marketing database 418, respectively. The clusters can have corresponding threshold indices and current indices that are measured for the compute 420 and storage 422 resources. In this example, the hosts on the clusters can be homogenous, that is, the host configuration can be the same in terms of compute, memory, and storage resources.

From the table 401, it can be determined that cluster C2 410 and cluster C3 412 are overloaded. In particular, cluster C2's 410 compute 420 index is shown as 0.7, which is greater than the compute 420 threshold index of 0.6. Similarly, cluster C2's 410 storage 422 index is 0.7, which is greater than the storage 422 threshold index of 0.6. Further, while cluster C3's 412 compute 420 index is 0.3, which is not greater than the compute 420 threshold index of 0.6, cluster C3's 412 storage 422 index is 0.7, which is greater than the storage 422 threshold index of 0.6. Accordingly, cluster C3's 412 storage 422 index can be satisfied by deploying a nested host on cluster C1 408. This is explained further with respect to FIGS. 4B and 4C.

FIG. 4B shows table 403 illustrating the impact of generating a nested cluster on the threshold indices described in connection with FIG. 4A. In particular, the disclosed systems can generate a nested host on cluster C1 408 to reduce cluster C3's 412 load. The disclosed systems can effectively increase cluster C1's 408 compute 420 index to 0.4, which can represent the minimum compute index for running a hypervisor on a nested host. Further, cluster C1's 408 storage 422 index can increase to 0.7, for example, because of an overhead contributing 0.1 to deploy the nested hypervisor itself. Further, by deploying a nested host on cluster C1 408, the disclosed systems can bring down cluster C3's 412 compute 420 index to 0.3 and storage 422 index to 0.4, respectively. In the example of FIG. 4B, the nested host deployed on cluster C1 408 is used to lower the measured indices of cluster C3 412 but not cluster C2 410.

In a further example, shown in FIG. 4C, the disclosed systems can reduce cluster C2's 410 compute 420 index and storage 422 index to be lesser than or equal to their respective index thresholds of 0.6 by deploying nested hosts on cluster C3 412. This can change cluster C2's 410 indexes to a compute 420 index of 0.6 and a storage 422 index 0.6, which can be equal or less than the threshold of 0.6. Accordingly, the disclosed systems can resource balance clusters C1 408, C2 410, and C3 412. In an alternative example where cluster C1 408 reflects lower compute 420 and storage 422 values after creation of the first nested host, a second nested host can be deployed on cluster C1 408, rather than cluster C3 412 as described.

In some examples, the cluster monitoring service 124 can first determine that the load on a cluster with nested hosts is reduced. Then the cluster monitoring service 124 can determine whether the indexes would exceed the threshold if the nested hosts are removed. If the cluster monitoring service 124 determines that the indices would be within respective threshold limits with reduced resources (for example, with the nested hosts removed), cluster monitoring service 124 can remove the nested hosts.

FIGS. 5A-5B illustrate example tables of historical records of nested hosts loaned out to clusters, which can be used by the system in future virtual resource management. In particular, the nested host manager (for example, nested host manager 128) can maintain a historical record of nested hosts loaned out to clusters. In some cases, the load on a cluster having provided resources to other clusters can increase. Accordingly, the nested host manager can release the loaned resources instead of asking for extra resource from other clusters. In particular, the nested host manager can determine an index characterizing the cluster's computational load. The nested host manager can then determine that a projected index characterizing the cluster's computational load without the use of the nested host drops below an index threshold. Further, the nested host manager can remove the nested host from the cluster.

FIGS. 5A and 5B illustrate tables of example historical records of nested hosts loaned out to clusters. In particular, FIG. 5A illustrates a table 501 of nested hosts and respective resources properties 504 and statuses 506. The nested hosts can have nested host identifiers NH IDs 502 such as N1 508, N2 510, and N3 512. FIG. 5A shows that nested host N1 508 can have a resource property 504 of 32 GB of memory, 4 TB of storage, and 8 cores. Further, nested host N2 510 can have a resource property of 16 GB of memory, 1 TB storage, and 4 cores. Nested host N3 512 can have a resource property of 8 GB of memory, 1 TB of storage, and 4 cores. FIG. 5A also shows that nested hosts N1 508 and N2 510 can have a status 506 of assigned, while nested host N3 has a status 506 of unassigned.

FIG. 5B illustrates a table 503 of the recorded assignment details for the nested hosts N1 508 and N2 510 that had a status 506 of assigned. In particular, table 503 illustrates an owner 512 field, a loaned to 514 field, a time 516 field, and an NH_ID 518 field. For example, as shown in the first row of table 503, the disclosed systems can record that the nested host manager loaned cluster C1 to cluster C2 for a time of T1, and that the corresponding nested host had a NH_ID of N1. Further, as shown in the second row of table 503, the disclosed systems can record that the nested host manager loaned cluster C3 to cluster C2 for a time of T1, and that the corresponding nested host had a NH_ID of N2.

In some examples, if C2's load peaks, the nested host manager can use C1 to provide resources to C2 in order to reduce C2's load. If C1's load goes above a predetermined threshold in the future, the nested host manager can determine if another cluster can satisfy C2's resource requests. The nested host manager can also release C1's resources so that C1's load is reduced. Accordingly, the above example shows how the disclosed systems can use historical records of nested hosts loaned out to clusters to determine future virtual resource management among the clusters.

Another example of possible operations of the disclosed systems is provided below. In particular, the disclosed systems can have a cluster sizing service 124 that can size the clusters as follows. An example first cluster, cluster C1, can have a resource request to get indices below respective thresholds. The resource request can include a request for a CPU having 16 cores at 2 GHz per core, a memory capacity of 64 GB, and a storage capacity of 1 TB.

The nested host manager 128 can search the hosts in the management cluster and their respective policies. The nested host manager 128 can then find the maximum available memory for a given virtual machine. The nested host manager 128 can obtain this information from an entity (for example, data center management server application) managing this cluster. The nested host manager 128 can search for the maximum configuration possible for a virtual machine on this domain and can reserve this capacity.

For example, the disclosed systems can deploy a virtual machine with 32 GB memory and 500 GB of storage resources. Taking the overhead for the nested host in consideration, the disclosed systems can need to obtain greater resources than the virtual machine. For example, for a 2 GB memory overhead and a 4 GB storage overhead, the disclosed systems can need to satisfy a 64 GB–(32 GB–2 GB)=34 GB memory and a 1024 GB–(500 GB–4 GB)=520 GB of storage of a cluster C1's resource request. The nested host manager 128 can reserve the allowed capacity and can search for the next largest virtual machine that can be deployed. The nested host manager 128 can continue to search and reserve resources until the original resource request is met.

Once the number of nested hosts is finalized, the nested host manager 128 can allocate virtual CPUs to the nested hosts as needed. For example, larger nested hosts can be allocated more virtual CPUs. The nested host manager 128 can match the CPU count to the number of cores originally requested, and can additionally provide for the overhead of the deployed nested hosts. The nested host manager 128 can set domain or virtual-machine-level policies to guarantee that the nested hosts in the cluster get the reserved CPU, memory, and storage resources. As an example, a resource pool can be created to house the nested hosts on a management cluster. The disclosed systems can reserve the resource pool. For example, the disclosed systems can reserve 16.2=32 GHz, plus overhead. The overhead can include overhead for CPU resources and 64 GB in addition to memory resource overhead for the nested hosts. Accordingly, the disclosed systems have the technical advantage of enabling the sharing of resources provided by larger hosts to satisfy the resource requests of multiple overloaded clusters.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for virtual resource management, the system comprising a non-transitory computer-readable medium and a processor that executes instructions from the computer-readable medium to perform a method, the method comprising:

determining that a cluster is overloaded, the overloaded cluster comprising a set of hosts, the set of hosts including a physical host; and in response to determining that the cluster is overloaded:

identifying an additional cluster having available resources;

instantiating a nested host on the additional cluster, the nested host being configured to provide the available resources, the nested host comprising a hypervisor;

registering the nested host with the overloaded cluster such that the overloaded cluster is authorized to use the available resources; and rebalancing a load across the set hosts and the nested host.

2. The system of claim 1, wherein the determining that the cluster is overloaded comprises:

computing indices for the cluster, the indices characterizing the cluster's load; and determining that at least one index of the indices exceeds an index threshold.

3. The system of claim 1, wherein the determining that the cluster is overloaded comprises receiving a request for a resource that the cluster cannot satisfy.

4. The system of claim 1, wherein the method further comprises:

identifying a third cluster having the available resources;

instantiating a second nested host on the third cluster; and registering the second nested host with the overloaded cluster, wherein registering the second nested host with the overloaded cluster is performed based on determining that the overloaded cluster requires additional resources.

5. The system of claim 1, wherein the method further comprises:

identifying a second overloaded cluster;

instantiating a second nested host on the additional cluster; and registering the second nested host with the second overloaded cluster.

6. The system of claim 1, wherein the method further comprises:

in response to determining that a projected index indicates that the cluster's current load could be satisfied without using resources of the nested host removing the nested host from the cluster.

7. The system of claim 1, wherein the method further comprises: in response to determining that the additional cluster has an increased load, deregistering the nested host from the overloaded cluster to release the available resources back to the additional cluster.

8. A method for virtual resource management comprising:

determining that a cluster is overloaded, the overloaded cluster comprising a set of hosts, the set of hosts including a physical host; and in response to determining that the cluster is overloaded:

identifying an additional cluster having available resources;

instantiating a nested host on the additional cluster, the nested host being configured to provide the available resources and the nested host comprising a hypervisor;

registering the nested host with the overloaded cluster such that the overloaded cluster is authorized to use the available resources; and rebalancing a load across the set hosts and the nested host.

9. The method of claim 8, wherein the determining that the cluster is overloaded comprises:

computing indices for the cluster, the indices characterizing the cluster's load; and determining that at least one index of the indices exceeds an index threshold.

10. The method of claim 8, wherein the determining that the cluster is overloaded comprises receiving a request for a resource that the cluster cannot satisfy.

11. The method of claim 8, further comprising:

identifying a third cluster having the available resources;

instantiating a second nested host on the third cluster; and registering the second nested host with the overloaded cluster, wherein registering the second nested host with the overloaded cluster is performed based on determining that the overloaded cluster requires additional resources.

12. The method of claim 8, further comprising:

determining an index characterizing the cluster's load;

determining that a projected index characterizing the cluster's load without using the nested host drops below an index threshold; and removing the nested host from the cluster.

13. The method of claim 8, further comprising: in response to determining that the additional cluster has an increased load, deregistering the nested host from the overloaded cluster to release the available resources back to the additional cluster.

14. The method of claim 8, further comprising:

identifying a second overloaded cluster;

instantiating a second nested host on the additional cluster; and registering the second nested host with the second overloaded cluster.

15. A non-transitory, computer-readable medium containing instructions that, when executed by a processor, performs a method, the method comprising:

determining that a cluster is overloaded, the overloaded cluster comprising a set of hosts, the set of hosts including a physical host; and in response to determining that the cluster is overloaded:

identifying an additional cluster having available resources;

instantiating a nested host on the additional cluster, the nested host being configured to provide the available resources and the nested host being a virtual machine (VM) having a hypervisor;

registering the nested host with the overloaded cluster such that the overloaded cluster is authorized to use the available resources from the additional cluster; and rebalancing a load across the set hosts and the nested host.

16. The non-transitory, computer-readable medium of claim 15, wherein the determining that the cluster is overloaded comprises:

computing indices for the cluster, the indices characterizing the cluster's load;

determining an index threshold associated with the cluster; and determining that at least one index of the indices exceeds the index threshold.

17. The non-transitory, computer-readable medium of claim 15, wherein the method further comprises:

identifying a third cluster having the available resources;

instantiating a second nested host on the third cluster; and registering the second nested host with the overloaded cluster, wherein registering the second nested host with the overloaded cluster is performed based on determining that the overloaded cluster requires additional resources.

18. The non-transitory, computer-readable medium of claim 15, wherein the method further comprises: in response to determining that a projected index indicates that the cluster's current load can be satisfied without using resources of the nested host, removing the nested host from the cluster.

19. The non-transitory, computer-readable medium of claim 15, wherein the method further comprises: in response to determining that the additional cluster has an increased load, deregistering the nested host from the cluster to release the available resources back to the additional cluster.

20. The non-transitory, computer-readable medium of claim 15, wherein the method further comprises:
   in response to identifying a second overloaded cluster:
      instantiating a second nested host on the additional cluster; and
      registering the second nested host with the second overloaded cluster.

21. A method for virtual resource management comprising:
   determining that a cluster is overloaded, the overloaded cluster comprising a first physical host; and
   in response to determining that the cluster is overloaded:
      identifying an additional cluster having available resources, the cluster comprising a second physical host, wherein the additional cluster is identified based on the proximity of the second physical host to the first physical host;
      instantiating a nested host on the additional cluster, the nested host being placed on the second physical host; and
      registering the nested host with the overloaded cluster such that the overloaded cluster is authorized to use the available resources.

22. The method of claim 21, further comprising:
   rebalancing a load across the first physical host and the nested host.

23. The method of claim 21, wherein the first physical host and the second physical host are in the same physical rack.

24. The method of claim 21, wherein the overloaded cluster and the additional cluster are part of a hyper-converged infrastructure.

* * * * *